3,000,071
METHOD OF SINTERING INTERMETALLIC MATERIALS
Ralph F. Wehrmann, Waukegan, Ill., assignor to Fansteel Metallurgical Corporation, a corporation of New York
No Drawing. Filed Apr. 23, 1953, Ser. No. 350,760
8 Claims. (Cl. 25—156)

My invention relates to silicides of columbium and tantalum, and to a method of producing the same.

More particularly, this invention relates to non-porous bodies of disilicides of columbium and tantalum formed into shaped bodies of the character of bars, rods, tubes, plates, discs, pellets, and the like, or irregular shapes of high compressive strength and density, substantially free of porosity and oxidizable impurities, as well as binder substances of organic and inorganic character which differ in chemical and physical properties from the disilicides of columbium and tantalum, and to methods of forming the same.

Silicides of columbium and tantalum, desirably produced in the form of dense, nonporous, shaped bodies according to the present invention, have a high degree of resistance to oxidation in air at elevated temperatures as well as erosion by other hot gases, have great hardness and compressive strength as well as wear resistance, and thereby have outstanding utility in oil burner and rocket nozzles, nozzles in artillery pieces, electrical resistance elements, component parts for jet engines, turbine blades and buckets, and furnace elements, as well as analogous uses wherein such properties are necessary or desirable.

In a copending application of Beidler and Campbell, assigned to the present assignee, Serial No. 150,541, filed March 8, 1950, now Patent No. 2,665,474, molybdenum-silicon alloys or intermetallic compositions are described as being formed into shaped bodies by melting and casting. It was found that such products are inferior to products obtained by the present invention for certain uses requiring substantial compressive strength and wear resistance. Moreover, even in uses where only the property of columbium and tantalum silicides to resist oxidation in air is necessary, the hardened nonporous products of the present invention are superior, not only for their inherent capacity to resist oxidation at raised temperatures, but because of the nonporous mechanical structure obtainable. The shaped bodies of the present invention tend to resist permeation into their internal structure of oxidizing gases, and thereby have a longer life under oxidizing conditions, as compared to products not having this structure.

According to the present invention, it is found that if silicides of columbium and tantalum are reduced to an extremely fine particle size such as of the order of about 0.5 to 5 microns, the silicide powder, preferably upon being first mixed with a solid organic binder substance and then compressed under great pressure usually exceeding about 5 tons per square inch, such as from 5 to 60 tons per square inch, preferably 5 to 40 tons per square inch, may be sintered to the integral mass as shaped in the pressing to a density greater than 95% of the theoretical, to produce a shaped body having utility as stated above. The specific gravity of columbium disilicide theoretically is 5.69 grams per cubic centimeter and the specific gravity of tantalum disilicide theoretically is 9.13 grams per cubic centimeter. As will be apparent to a skilled worker in the art, these figures will vary with variations of columbium-silicon and tantalum-silicon proportions, whereby a content of other compounds of columbium and silicon and other compounds of tantalum and silicon may be present. The final products of the present invention have great compressive strength and hardness, are nonporous, wear resistant, and resistant to oxidation in air at high temperatures such as about 1600° to 2000° C. for long periods of time.

Both columbium disilicide and tantalum disilicide hereof are produced by mixing and heating columbium and silicon powders and tantalum and silicon powders, preferably in stoichiometric proportions, to produce columbium disilicide, $CbSi_2$, and tantalum disilicide, $TaSi_2$. Proportions to produce such compounds are preferred because in this form each silicide composition has the greatest resistance to oxidation in air at high temperatures. However, there is substantial resistance to oxidation in other forms of silicides of columbium and tantalum which may be present, in which the silicon content is either more or less than that of $CbSi_2$ or $TaSi_2$. Accordingly, in the broadest aspect of this invention, the silicon and columbium or tantalum may be adjusted in proportions to a ratio of about three atomic proportions of silicon to one of columbium or tantalum, down to one atomic proportion of silicon to one of columbium or tantalum. However as stated, preferred proportions are two atoms of silicon per atom of columbium or tantalum. Percentagewise, the silicon in the silicon-columbium composition may be mixed in proportions of about 23 to 47½% by weight of the mixture with columbium, and to form the preferred 2:1 atomic proportion mix corresponding to columbium disilicide, the silicon will be about 37 to 38% by weight of the mix.

The silicon in the silicon-tantalum composition may be mixed in proportions of about 13.4 to 32.0% by weight of the mixture with tantalum, and to form the preferred 2:1 atomic proportion mix corresponding to tantalum disilicide, the silicon will be about 23% to 24% by weight of the mix.

In forming the silicides of columbium or tantalum, the elemental powders silicon and columbium or silicon and tantalum, first homogeneously mixed, are heated to a temperature above about 1000° C., say about 1200° to 1400° C., preferably about 1300° C., in a nonoxidizing atmosphere which preferably is free of carbon, such as carbon monoxide, to avoid contamination of the product with carbon, which forms carbides of these elements and reduces resistance of the product to oxidation in air. Thus, a preferred nonoxidizing atmosphere is hydrogen or an inert gas such as helium or argon. After cooling the silicon and columbium or silicon and tantalum reaction product, it is comminuted to a powder of a size less than about 325 mesh. It is then further finely milled, with or without the organic substance as hereinafter described, preferably in a ball mill to produce evenly shaped powdered particles, which are desirably equiaxed grains as compared to acicular-shaped particles, the former being preferred because particles of such shape allow more even pressure transfer in the pressing thereof to form dense, nonporous, shaped bodies. The powder formed in the ball mill is in the critical particle size range of 0.5 to 5 microns, preferably about 1 micron, plus or minus 0.2 micron.

The organic binder substance is a thermoplastic organic resin or wax which may be volatilized and/or decomposed by heat in a manner to leave no substantial carbonaceous residue in the compressed and shaped product when heated to the silicide sintering temperature under nonoxidizing conditions. Preferred resins are the thermoplastic resins characterized by being volatilized and/or decomposed by heat without leaving any carbonaceous residue, and particularly preferred for this property are the alkyd resins. Such resin will be understood to be a temporary bonding resin which functions to flow under pressure to enhance the even transfer of pressure hydrostatically to all particles and to firmly adhere the compressed powder. Alkyd resins are quite superior since they flow under pressure, securely bond the particles, and leave no carbonaceous residue when heated above about 600° C. Thermosetting resins, such as Bakelite, are unsuitable. Typical alkyds are such as are formed by a reaction of a polybasic organic acid or anhydride such as phthalic acid, succinic acid, adipic acid, etc., with a polyhydroxy aliphatic alcohol such as glycerine, ethylene glycol, etc., of which the reaction product of phthalic anhydride with glycerine, i.e. Glyptal resin, is preferred. Additionally, volatilizable and/or decomposable waxes which do not leave a carbonaceous residue, of which paraffin wax, Acrawax and stearic acid are typical, are useful as a temporary binder.

The wax and some soft forms of resin which do not become tacky may be milled in solid form for homogeneous distribution into and about the columbium or tantalum silicide powder. For better and more homogeneous distribution, the solid binder substance may be first dissolved in a volatile solvent such as a ketone, i.e. acetone, or a hydrocarbon solvent such as petroleum or coal tar naphtha, and mixed with powdered particles of the silicide to form a damp powder, a wet paste or a slurry, and the solvent then evaporated to leave a binder coating of the resin or wax about the powdered silicide particles. Where the powdered silicide particles, after coating with the binder, are not sufficiently fine, they may be further milled in the presence of the binder to the critical particle size above stated.

The powder mass, together with the binder coating homogeneously applied thereto, is then placed in the die of a press which, if desired, may be coated with a lubricant, such as stearic acid, and then subjected to a preforming and shaping pressure of at least about 5 tons per square inch, such as from 5 to 50 tons per square inch, to form a dense, nonporous, shaped product. The shaped and compressed product is then placed in a furnace, such as a molybdenum wound tube furnace, and heated in an atmosphere such as stated above, preferably hydrogen or argon. The shaped mass is first heated up to about 600° C. slowly to allow the organic binder to be volatilized slowly in order to avoid introducing porosity into the compressed product. Thereafter, the temperature may be raised relatively rapidly. At temperatures below about 1300° C., incompletely sintered products are sometimes obtained; at temperatures exceeding about 1700° C., the products obtained are progressively more porous. Thus, while a sintering temperature in the range of about 1300° to 1800° C. may be used, optimum sintering temperatures are in the range of 1400° to 1600° C. The sintering time may range from about 0.25 to 1.25 hours, but 0.5 to 1 hour is optimum time.

The outstanding characteristics of the present invention, as pointed out above, is that dense bodies may be formed by shaping, with great pressure of the order of 5 to 50 tons per square inch, particles of columbium disilicide or particles of tantalum disilicide in a critical particle size range of about 0.5 to 5 microns, preferably about 1 micron, plus or minus 0.2 micron. Particles of these substances in this size range are so fine that they tend to flow under pressure, and allow even pressure transfer which is considerably enhanced by the presence of a thermoplastic resin or wax, the organic substance further serving as a temporary binder to allow handling during the subsequent step of sintering to form an integral, dense, nonporous, shaped body thereof as described above.

It is possible to omit the organic binder substance in accordance with the present invention if the average particle size of the columbium disilicide or the tantalum disilicide powder is maintained below 1 micron, such as between 0.5 to 0.8 micron, since powdered particles of this critical particle size range may be packed to the desired density and cohesion at high pressures of about 20 to 60 tons per square inch. The resulting form-sustaining compact may be sintered to the desired integral and dense form by placing the compact (without preheating) in the hottest part of a hydrogen (or other nonoxidizing, non-carbonaceous) atmosphere furnace maintained at a temperature of about 1400° to 1600° or somewhat higher, preferably about 1500° C., and holding it there for a time period of about ¾ to 2 hours, preferably about 1 hour.

Shaped bodies, made with binder as described above, of columbium disilicide exhibit a cross-break strength of about 30,000 to 50,000 pounds per square inch, a Rockwell A hardness of about 78 to 88, a density in the range of 5.1 to 5.5 grams per cubic centimeter, and an oxidation resistance in air at 1700° C. usually exceeding about 50 hours. Shaped bodies of tantalum disilicide exhibit generally similar strength characteristics and oxidation desistance in air, but are of slightly lower hardness, generally in the range of 78 to 85 Rockwell A, and are of higher density, in the range of 8.2 to 8.7 grams per cubic centimeter.

The following examples illustrate the practice of this invention.

*Example 1*

Technically pure, finely divided, elemental columbium and silicon powders in a particle size of less than about 200 mesh are homogeneously mixed in proportions of 37.5 parts of silicon to 62.5 parts of columbium by weight, and heated in an ordinary tube furnace while passing dry, oxygen-free hydrogen therethrough at a temperature of 1300° C., plus or minus 50° C., for a period of 45 minutes. The reaction product comprising substantially columbium disilicide with less than about 5% of higher and lower silicides of columbium, has an ultimate density of 5.69 grams per cubic centimeter. The columbium disilicide thus formed is crushed in a mill to pass a screen of about 325 mesh. The columbium disilicide powder is then ball milled to an average particle size of 1 micron, plus or minus 0.2 micron.

The columbium disilicide powder in proportion of 500 grams is wet with a solution of 5 grams of Glyptal resin dissolved in 50 cc. of acetone. The acetone is then evaporated, the mass powdered and placed in a press having a die to shape the powder into ¼ inch square by 6 inch long bars, and shaped therein under a forming pressure of 20 tons per square inch. The green, temporarily bonded bars are then placed in a molybdenum wound tube furnace, dry hydrogen gas which has been freed of residual traces of oxygen is passed therethrough, and heating begun in order to slowly raise the temperature. The temperature is raised over a period of 15 minutes to 600° C. to volatilize and/or decompose the binder, after which the heat is raised relatively rapidly to 1500° C. and held at that temperature for a total heating period, including the preliminary heating, of approximately 1 hour. The columbium disilicide bars thus formed are found to have a cross-break strength of 35,000 to 40,000 pounds per square inch, a Rockwell A hardness of 80 to 85, and a density of approximately 5.4 grams per cubic centimeter. The bars are found to withstand more than 50 hours when heated in air to a temperature of 1700° C.

*Example 2*

Technically pure, finely divided, elemental tantalum and silicon powders in a particle size of less than about 200 mesh are homogeneously mixed in proportions of 23.5 parts of silicon and 76.5 parts of tantalum by weight, and heated in an ordinary tube furnace while passing dry, oxygen-free hydrogen therethrough at a temperature of 1350° C., plus or minus 50° C., for a period of 50 minutes. The reaction product comprising substantially tantalum disilicide with less than about 5% of higher and lower silicides of tantalum, has an ultimate density of 9.13 grams per cubic centimeter. The tantalum disilicide thus formed is crushed in a mill to pass a screen of about 325 mesh. The tantalum disilicide powder is then ball milled to an average particle size of 1 micron, plus or minus 0.2 micron.

The tantalum disilicide powder, in proportion of 500 grams, is wet with a solution of 5 grams of Glyptal resin dissolved in 50 cc. of acetone. The acetone is then evaporated, the mass powdered and placed in a press of a die to shape the powder into ¼ inch square by 6 inch long bars are then placed in a molybdenum wound tube furtons per square inch. The green, temporarily bonded bars are then placed in a molybdenum wound tube furnace, dry hydrogen gas which has been freed of residual traces of oxygen is passed therethrough, and heating begun in order to slowly raise the temperature. The temperature is raised over a period of 15 minutes to 600° C. to volatilize and/or decompose the binder, after which the heat is raised relatively rapidly to 1500 C. and held at that temperature for a total heating period, including the preliminary heating, of approximately 50 minutes. The tantalum disilicide bars thus formed are found to have a cross-break strength of about 40,000 pounds per square inch, a Rockwell A hardness of 78 to 80, and a density of approximately 8.5 grams per cubic centimeter. The bars withstand more than 50 hours when heated in air to a temperature of 1700° C.

*Example 3*

Bars of columbium disilicide are formed in the same manner as in Example 1, except that the dry powdered columbium disilicide is milled with dry Glyptal resin without solvent in proportion of 5 grams of resin to 500 grams of the powdered silicide, both being homogeneously mixed and size-reduced in a ball mill to about 1 micron size. The dry powder is pressed and sintered in the same manner as described in Example 1. The physical characteristics of bars formed therefrom are substantially the same as the bars of Example 1.

*Example 4*

The columbium disilicide powder, formed as in Example 1 and ball milled to an average particle size of about 0.75 micron, is compressed to circular pellets in a die without a binder under a forming pressure of 50 tons per square inch, the pellets formed having a dimension of approximately 1 inch thick by 1 inch in diameter. The pellets are placed in a tube furnace and heated (without preheating) for 1 hour at a temperature of 1500° C. The resulting pellets have a Rockwell A hardness of 83 to 88, a density of 5.5 grams per cubic centimeter, and a resistance to oxidation in air exceeding 50 hours.

*Example 5*

The tantalum disilicide powder, formed as in Example 2 and ball milled to an average particle size of about 0.8 micron, is compressed to pellets in a die without a binder under a forming pressure of 45 tons per square inch, the pellets formed having a dimension of approximately 1 inch thick by 1 inch in diameter. The pellets are carefully placed in a tube furnace and heated (without preheating), as in Example 2, to a temperature of 1500° C. for a period of 1 hour. The pellets are found to have a Rockwell A hardness of 80 to 84, a specific gravity of 8.7, and a resistance to oxidation in air exceeding 50 hours at 1700° C.

I claim:

1. The method of forming an article of manufacture of dense, nonporous, refractory character resistant to oxidation in air at high temperatures in the range of from about 1600° C. to about 2000° C., comprising milling to a particle size range of 0.5 to 5 microns an alloy or intermetallic composition of silicon with one of the metals selected from the group consisting of tantalum and columbium, said silicon being in proportion of 1 to 3 atoms of silicon per atom of metal, pressing said finely milled product under a forming pressure exceeding 5 tons per square inch, to regular forms of rods, bars, tubes, discs, plates, pellets and the like, and irregular forms, and heating said shaped product in an oxidizing free atmosphere to sinter the same in a temperature range of about 1300° to 1800° C.

2. The method of forming an article of manufacture of dense, nonporous, refractory character resistant to oxidation in air at high temperatures in the range of from about 1600° C. to about 2000° C., comprising milling an alloy or intermetallic composition of silicon with one of the metals selected from the group consisting of tantalum and columbium, said silicon being in proportion of 1 to 3 atoms of silicon per atom of metal, to a particle size range of 0.5 to 5 microns, homogeneously mixing the said fine particles with a temporary thermoplastic organic binder substance which volatilizes and decomposes, leaving substantially no carbonaceous residue at a temperature of at least about 1300° C., pressing the powdered mixture to shape the same under a forming pressure exceeding 5 tons per square inch to regular forms of rods, bars, tubes, discs, plates, pellets and the like, and irregular forms, and heating said shaped product in an oxidizing free atmosphere to sinter the same in a temperature range of about 1300° to 1800° C.

3. The method of forming an article of manufacture of dense, nonporous refractory character resistant to oxidation in air at high temperatures in the range of from about 1600° C. to about 2000° C. comprising milling an alloy or intermetallic composition of about 2 atoms of silicon and 1 atom of columbium to a particle size in the range of 0.5 to 5 microns, pressing said finely milled product under a forming pressure exceeding 5 tons per square inch, to shape the same to regular forms of rods, bars, tubes, discs, plates, pellets and the like, and irregular forms, and heating said shaped product in an oxidizing free atmosphere at a temperature of from about 1300° C. to about 1800° C. to sinter the same.

4. The method of forming an article of manufacture of dense, nonporous, refractory character resistant to oxidation in air at high temperatures in a range of from about 1600° C. to about 2000° C., comprising milling an alloy or intermetallic composition of about 2 atoms of silicon and 1 atom of tantalum to a particle size of 0.5 to 5 microns, pressing said finely milled product under a forming pressure exceeding 5 tons per square inch, to shape the same to regular forms of rods, bars, tubes, discs, plates, pellets and the like, and irregular forms, and heating said shaped product in an oxidizing free atmosphere at a temperature of from about 1300° C. to about 1800° C. to sinter the same.

5. The method of forming an article of manufacture of dense, nonporous, refractory character resistant to oxidation in air at high temperatures, in the range of from about 1600° C. to about 2000° C. comprising milling an alloy or intermetallic composition of silicon and one of the metals selected from the group consisting of tantalum and columbium, said silicon being present in proportion of about 1 to 3 atoms of silicon per atom of metal, to an average particle size of 0.5 to 0.8 micron, pressing said particles under a forming pressure of 40 to 60 tons per square inch, and sintering said shaped form in a nonoxidizing noncarbonaceous atmosphere at a temperature of about 1400° to 1600° C. for ¾ to 2 hours.

6. The method of forming an article of manufacture of dense, nonporous, refractory character, resistant to oxidation in air at high temperatures, in the range of from about 1600° C. to about 2000° C., comprising milling a silicide selected from the group consisting of columbium disilicide and tantalum disilicide to an average particle size of 0.5 to 0.8 micron, pressing said particles under a forming pressure of 40 to 60 tons per square inch, and sintering said shaped form in an oxidizing free, carbonaceous free atmosphere at a temperature of about 1400° to 1600° C. for ¾ to 2 hours.

7. The method of forming an article of manufacture of dense, nonporous, refractory character resistant to oxidation in air at high temperatures in the range of from about 1600° C. to about 2000° C., comprising milling a silicide selected from the group consisting of columbium disilicide and tantalum disilicide to an average particle size of 0.5 to 0.8 micron, pressing said particles under pressure of about 50 tons per square inch to temporarily bond the same into a shaped form, and sintering said shaped form in a hydrogen atmosphere at a temperature of about 1500° C. for a period of about 1 hour.

8. A method of forming an article of manufacture of dense, nonporous, refractory character resistant to oxidation in air, comprising milling an alloy or intermetallic composition of about 2 atoms of silicon and 1 atom of a metal selected from the group consisting of columbium and tantalum to an average particle size of about 1 micron, plus or minus 0.2 micron, mixing said particles with a temporary thermoplastic organic binder substance which volatilizes and decomposes, leaving substantially no carbonaceous residue at a temperature of at least about 1400° C., pressing the powdered mixture under a pressure exceeding about 5 tons per square inch to temporarily bond the same into a shaped form, and sintering said shaped product in an oxidizing free, carbonaceous free atmosphere at a temperature of about 1400° to 1600° C. for a period of about 0.75 to 1.25 hours.

References Cited in the file of this patent

UNITED STATES PATENTS

| | | |
|---|---|---|
| 1,996,220 | Sterky et al. | Apr. 2, 1935 |
| 2,116,399 | Marth | May 3, 1938 |
| 2,467,675 | Teaneck et al. | Apr. 19, 1949 |
| 2,593,943 | Wainer | Apr. 22, 1952 |
| 2,619,406 | Briney | Nov. 25, 1952 |
| 2,622,304 | Coffer | Dec. 23, 1952 |

OTHER REFERENCES

Foster et al.: "Sintering Carbides by Means of Fugitive Binders," published in Journal of the American Ceramic Society, vol. 33, No. 1, January 1950, pp. 27–33.

Mellor: "Comprehensive Treatise on Inoragnic and Theoretical Chemistry," vol. 6, pp. 168–190 and 192, published 1925.

Brewer et al.: "High Melting Silicides," published in Journal of the American Ceramic Society, vol. 33, No. 10, October 1, 1950, pages 291–294.

UNITED STATES PATENT OFFICE
CERTIFICATION OF CORRECTION

Patent No. 3,000,071                          September 19, 1961

Ralph F. Wehrmann

It is hereby certified that error appears in the above numbered patent requiring correction and that the said Letters Patent should read as corrected below.

Column 5, lines 4 and 5, for "bars are then placed in a molybdenum wound tube furtons per square inch. The green, temporarily bonded" read -- bars, and shaped therein under a forming pressure of 20 tons per square inch. The green, temporarily bonded --; column 6, line 55 and 56, for "a non-oxidizing noncarbonaceous" read -- an oxidizing free, carbonaceous free, --.

Signed and sealed this 3rd day of April 1962.

(SEAL)
Attest:

ERNEST W. SWIDER                          DAVID L. LADD
Attesting Officer                          Commissioner of Patents